US008837277B2

(12) United States Patent
Vasseur et al.

(10) Patent No.: US 8,837,277 B2
(45) Date of Patent: Sep. 16, 2014

(54) SOURCE ROUTING CONVERGENCE IN CONSTRAINED COMPUTER NETWORKS

(75) Inventors: Jean-Philippe Vasseur, Saint Martin dUriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 13/151,109

(22) Filed: Jun. 1, 2011

(65) Prior Publication Data

US 2012/0307629 A1 Dec. 6, 2012

(51) Int. Cl.
*H04L 1/00* (2006.01)
*H04L 12/54* (2013.01)
*H04L 12/721* (2013.01)

(52) U.S. Cl.
CPC ............. *H04L 12/56* (2013.01); *H04L 45/34* (2013.01)
USPC .......... 370/228; 370/219; 370/224; 370/256; 370/394; 370/408; 709/238; 709/252

(58) Field of Classification Search
CPC ......... H04L 45/00; H04L 45/34; H04L 45/24; H04L 45/48; H04L 45/28; H04L 47/34; H04L 47/27; H04L 47/10; H04L 12/56; H04L 1/08; H04W 40/30
USPC .......... 370/256, 351, 408, 228, 394; 709/238, 709/252
See application file for complete search history.

(56) References Cited

U.S. PATENT DOCUMENTS

| 5,742,760 | A  | * | 4/1998  | Picazo et al. ............ 709/249 |
| 5,841,990 | A  | * | 11/1998 | Picazo et al. ............ 709/249 |
| 6,389,041 | B1 | * | 5/2002  | Morita et al. ............ 370/503 |
| 6,694,361 | B1 | * | 2/2004  | Shah et al. ............. 709/222 |
| 7,366,111 | B2 |   | 4/2008  | Thubert et al. |
| 7,373,543 | B1 | * | 5/2008  | Jain et al. ............. 714/4.4 |
| 7,539,154 | B1 | * | 5/2009  | MacKay et al. .......... 370/256 |

(Continued)

OTHER PUBLICATIONS

Asokan, et al., "Ant Based Dynamic Source Routing Protocol to Support Multiple Quality of Service (QoS) Metrics in Mobile Ad Hoc Networks", International Journal of Computer Science and Security, vol. 2, Issue 3 (2008), 9 pages.

(Continued)

*Primary Examiner* — Andrew Chriss
*Assistant Examiner* — Rasha Fayed
(74) *Attorney, Agent, or Firm* — Edwards Wildman Palmer LLP; James M. Behmke; Stephen D. LeBarron

(57) ABSTRACT

In one embodiment, a source routing device (e.g., root device) pre-computes diverse source-routed paths to one or more nodes in a computer network. Upon receiving a particular packet, the device forwards the particular packet on a source-routed first path of the pre-computed diverse paths. In the event the device implicitly detects failure of the first path, then it forwards a copy of the particular packet on a source-routed second path of the pre-computed diverse paths in response. In one embodiment, implicit failure detection comprises seeing a second (repeated) packet with the same identification within a certain time since the first packet, and the second packet is forwarded on the second path. In another embodiment, implicit failure detection comprises not seeing a link-layer acknowledgment returned or receiving an error notification from a node along the broken path, and a stored copy of the particular packet is forwarded on the second path.

20 Claims, 19 Drawing Sheets

(56) References Cited

U.S. PATENT DOCUMENTS

| | | | |
|---|---|---|---|
| 7,693,064 B2* | 4/2010 | Thubert et al. | 370/235 |
| 7,707,307 B2 | 4/2010 | Miles et al. | |
| 7,852,772 B2 | 12/2010 | Filsfils et al. | |
| 7,920,566 B2 | 4/2011 | Bryant et al. | |
| 7,924,722 B2 | 4/2011 | Thubert et al. | |
| 7,933,197 B2 | 4/2011 | Bryant et al. | |
| 7,940,776 B2 | 5/2011 | Retana et al. | |
| 8,139,510 B2* | 3/2012 | Thottakkara | 370/256 |
| 8,249,051 B2* | 8/2012 | Spinar et al. | 370/351 |
| 8,279,759 B1* | 10/2012 | Jones | 370/248 |
| 8,369,707 B2* | 2/2013 | D'Alessandro et al. | 398/79 |
| 2002/0029287 A1* | 3/2002 | Yemini et al. | 709/238 |
| 2002/0133632 A1* | 9/2002 | Salloum Salazar | 709/253 |
| 2003/0179707 A1* | 9/2003 | Bare | 370/235 |
| 2004/0062248 A1* | 4/2004 | Nagarajan et al. | 370/394 |
| 2004/0105422 A1* | 6/2004 | Sahni et al. | 370/351 |
| 2005/0021841 A1* | 1/2005 | Yoshimoto | 709/238 |
| 2006/0072460 A1* | 4/2006 | Fukui et al. | 370/235 |
| 2006/0203819 A1* | 9/2006 | Farinacci et al. | 370/390 |
| 2007/0002770 A1* | 1/2007 | Haalen et al. | 370/256 |
| 2007/0014276 A1* | 1/2007 | Bettink et al. | 370/351 |
| 2007/0053357 A1* | 3/2007 | Liu et al. | 370/390 |
| 2007/0283038 A1* | 12/2007 | Asati et al. | 709/238 |
| 2008/0095045 A1* | 4/2008 | Owens et al. | 370/220 |
| 2008/0225713 A1 | 9/2008 | Tychon et al. | |
| 2008/0279096 A1* | 11/2008 | Sullivan et al. | 370/221 |
| 2010/0046363 A1* | 2/2010 | Shenoy et al. | 370/216 |
| 2010/0091800 A1* | 4/2010 | Perkins et al. | 370/474 |
| 2010/0125674 A1 | 5/2010 | Vasseur et al. | |
| 2010/0268817 A1* | 10/2010 | Shah-Heydari | 709/224 |
| 2010/0271944 A1* | 10/2010 | Michaelis et al. | 370/230.1 |
| 2011/0029687 A1* | 2/2011 | Kirrmann et al. | 709/236 |
| 2011/0317696 A1* | 12/2011 | Aldrin et al. | 370/390 |

OTHER PUBLICATIONS

Johnson, et al., "DSR: The Dynamic Source Routing Protocol for Multi-Hop Wireless Ad Hoc Networks", In Ad Hoc Networking, edited by Charles E. Perkins, Chapter 5, Addison-Wesley,(2001), 25 pages.

"RPL: IPv6 Routing Protocol for Low Power and Lossy Networks" <draft-ietf-roll-rpl-19> by Winter, at al. (Mar. 13, 2011 version).

"Routing Metrics used for Path Calculation in Low Power and Lossy Networks" <draft-ietf-roll-routing-metrics-19> by Vasseur, et al. (Mar. 1, 2011 version).

"RPL Objective Function 0" <draft-ietf-roll-of0-11> by Thubert (May 5, 2011 version).

"The Minimum Rank Objective Function with Hysteresis" <draft-ietf-roll-minrank-hysteresis-of-03> by O. Gnawali et al. (May 3, 2011 version).

\* cited by examiner

SOURCE ROUTING CONVERGENCE IN CONSTRAINED COMPUTER NETWORKS

TECHNICAL FIELD

The present disclosure relates generally to computer networks, and, more particularly, to convergence within source-routed networks in the event of a network element failure.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Due to the constraints associated with LLNs, as well as for other types of networks and for other reasons, source routing may be used to forward packets through the network, such that a transmitting device inserts into the packet an explicitly indicated path to be followed. In this manner, devices in the network need not store routing information, and may simply pass a source-routed packet through the network according to the indicated path.

One of the main challenges with source routing, however, is convergence time. For example, certain networks use routing protocols without any type of fast probing to maintain routing adjacency (a resource-intensive technique), particularly in constrained networks such as LLNs. In these networks, nodes may detect link failure using slow probing or Neighbor Unreachability Detection (NUD) after sending a data packet. So for example, if a packet needs to reach a particular node, and the source-routed path to that node experiences a failure, the network may be unaware of the failure until a probe detects the failure, which may, in certain configurations, take up to several minutes, a time for which the network will continue to send packets along the broken path. Note also that in LLNs, an error may be sent by the node immediately attached to the failed link, thus serving as an indicator of the failure; still since such links are inherently not reliable, such an error may be lost, thus implying the impossibility to detect the failure, and packets would thus continue to be forwarded along the broken path.

BRIEF DESCRIPTION OF THE DRAWINGS

The embodiments herein may be better understood by referring to the following description in conjunction with the accompanying drawings in which like reference is numerals indicate identically or functionally similar elements, of which.

DESCRIPTION OF EXAMPLE EMBODIMENTS

Overview

Figure 1:
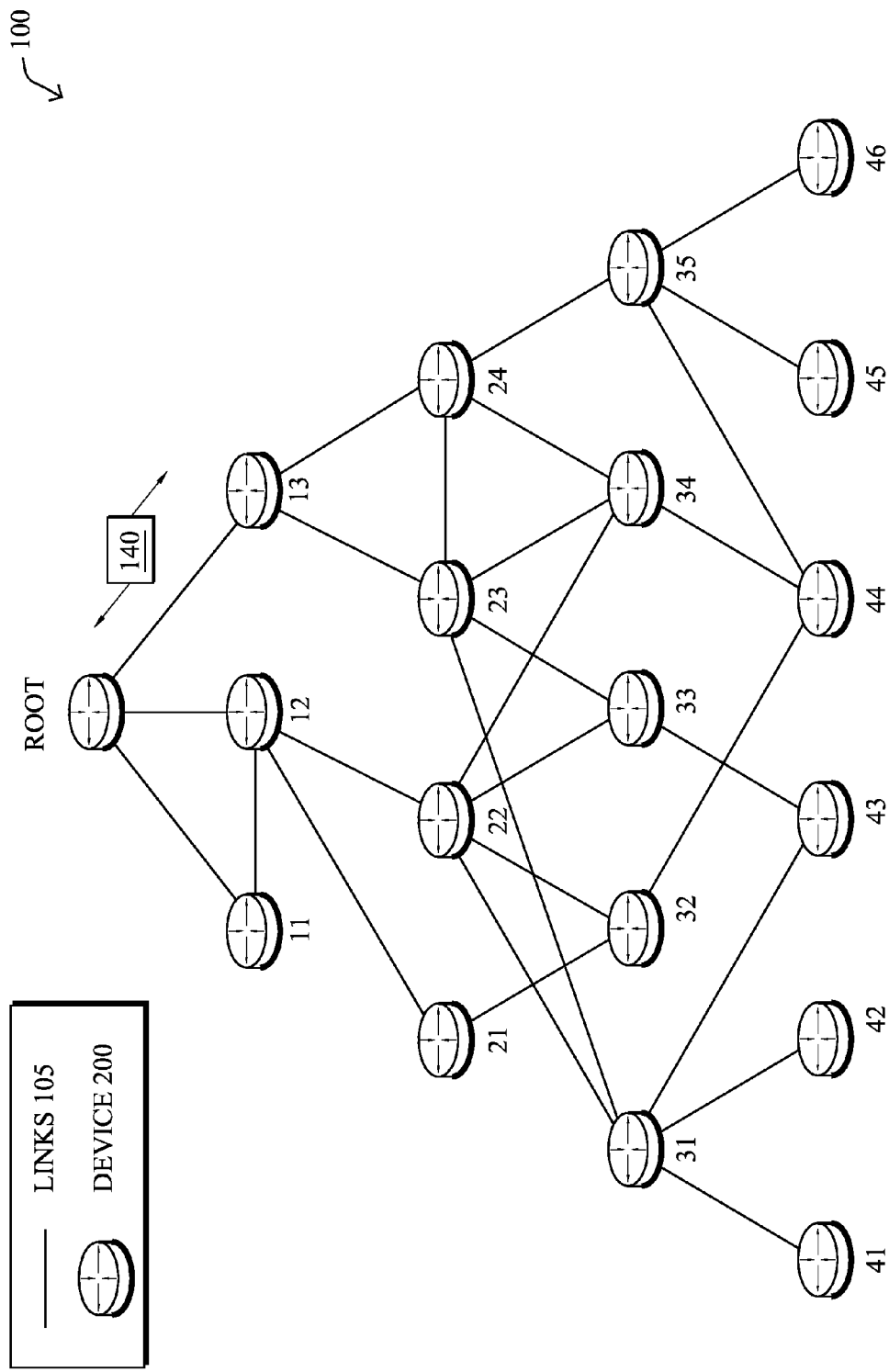
FIG. 1 illustrates an example computer network.

According to one or more embodiments of the disclosure, a source routing device (e.g., root device) pre-computes diverse source-routed paths to one or more nodes in a computer network. Upon receiving a particular packet, the device forwards the particular packet on a source-routed first path of the pre-computed diverse paths. In the event the device implicitly detects failure of the first path, then it forwards a copy of the particular packet on a source-routed second path of the pre-computed diverse paths in response. In one embodiment, implicit failure detection comprises seeing a second (repeated) packet with the same identification within a certain time since the first packet, and the second packet is forwarded on the second path. In another embodiment, implicit failure detection comprises not seeing a link-layer acknowledgment returned, and a stored copy of the particular packet is forwarded on the second path.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

FIG. 1 is a schematic block diagram of an example computer network 100 illustratively comprising nodes/devices 200 (e.g., labeled as shown, "Root," "11," "12," ... "45," "46," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, to current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with is the root node generally centralized among a plurality of surrounding nodes.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4 (or 15.4 g), WiFi, Bluetooth®, etc.) or other shared media protocols where appropriate (e.g., PLC). In this context, a protocol consists of a set of rules defining how the nodes interact with each other.

Figure 2:
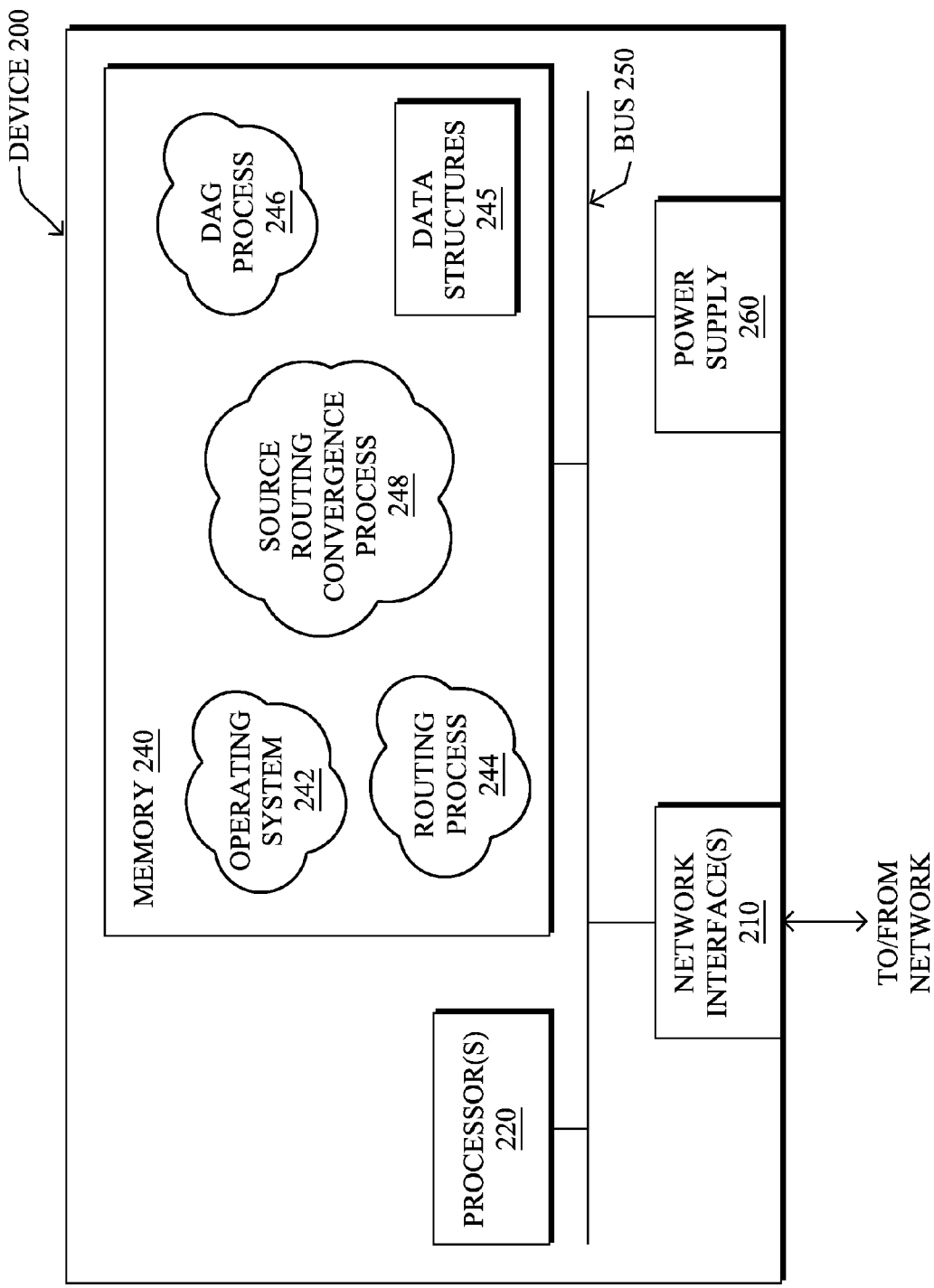
FIG. 2 illustrates an example network device/node.

FIG. 2 is a schematic block diagram of an example device 200 that may be used with one or more embodiments described herein, e.g., as a source-routing device such as the root device or other source-route head-end device. The device may comprise one or more network interfaces 210 (e.g., wireless), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (e.g., wirelessly, via PLC, etc.). The network interfaces may be configured to transmit and/or receive data using a variety of different communication protocols, particularly depending upon the underlying transmission medium (e.g., wireless, PLC, wired, etc.). Note, further, that a node may have two different types of network connections 210, namely, wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. For instance, these software processes and/or services may comprise routing process/services 244, which may include a directed acyclic graph (DAG) process 246 in certain embodiments, and also an illustrative source routing convergence process 248 as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices is simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy is Networks"<draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-11> by Thubert (May 5, 2011 version) and "The Minimum Rank Objective Function with Hysteresis"<draft-ietf-roll-minrank-hysteresis-of-03> by O. Gnawali et al. (May 3, 2011 version).

Building a DAG may utilize a discovery mechanism to build a logical representation of the network, and route dissemination to establish state within the is network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
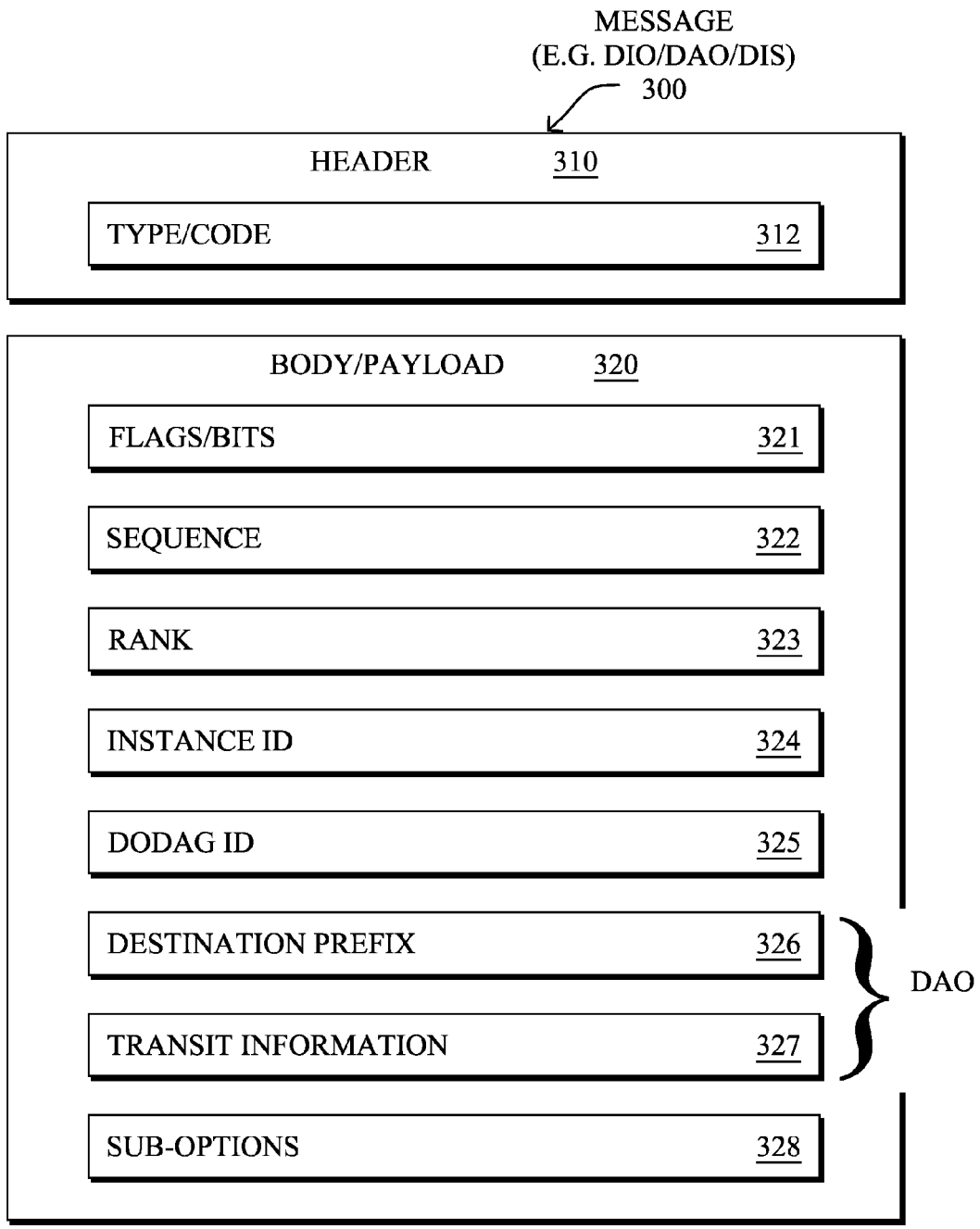
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
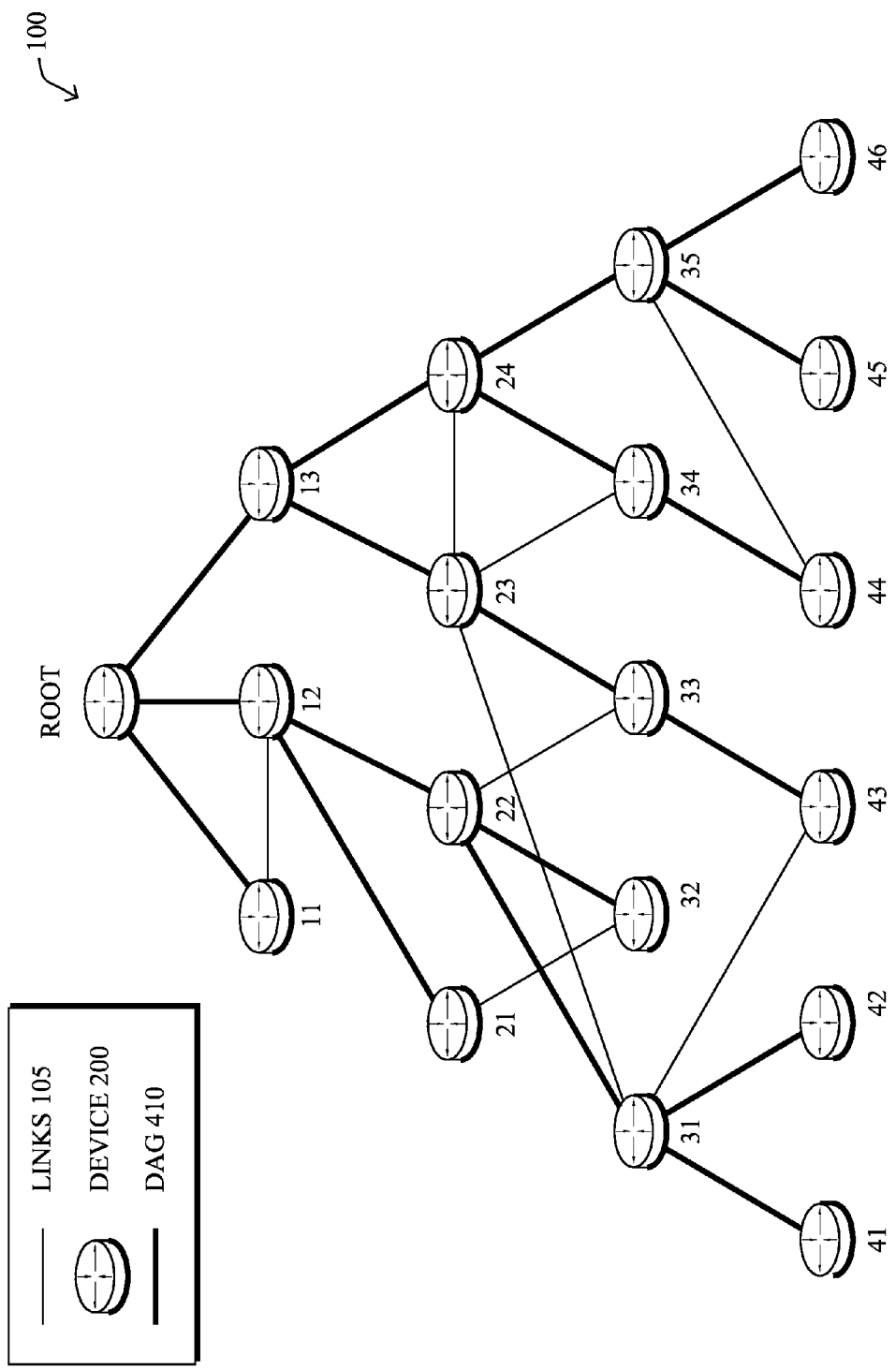
FIG. 4 illustrates an example directed acyclic graph (DAG) in the computer network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes.

RPL supports two distinct modes of operation: a storing mode and a non-storing mode. In the storing mode, each node provides information to its DAG parent(s) about the prefix (es)/address(es) that it owns. Upon receiving this information, each node populates its routing table in support of downward routing (routing packets in the DOWN direction—as a reminder UPWARD routing is performed by sending packet along the DAG toward the DAG root). Conversely, in the non-storing mode, nodes do not store routing information (except parents' next hops in support of the DAG and UPWARD routing). This allows for memory saving on intermediate nodes and is particularly suited to (although not restricted to) P2MP and MP2P traffic. Indeed, when a node sends a packet upward (e.g., to a concentrator potentially co-hosted with the DAG root or an NMS), the packet simply follows the DAG. In the opposite direction (e.g., packets sent by the NMS to a meter or a set of meters), since intermediate nodes do not store routes, the packets are source routed. For instance, the chosen route is set forth within the packet's header (e.g., an IPv6 header), according to a source-routing head-end node's routing decision.

Figure 5:
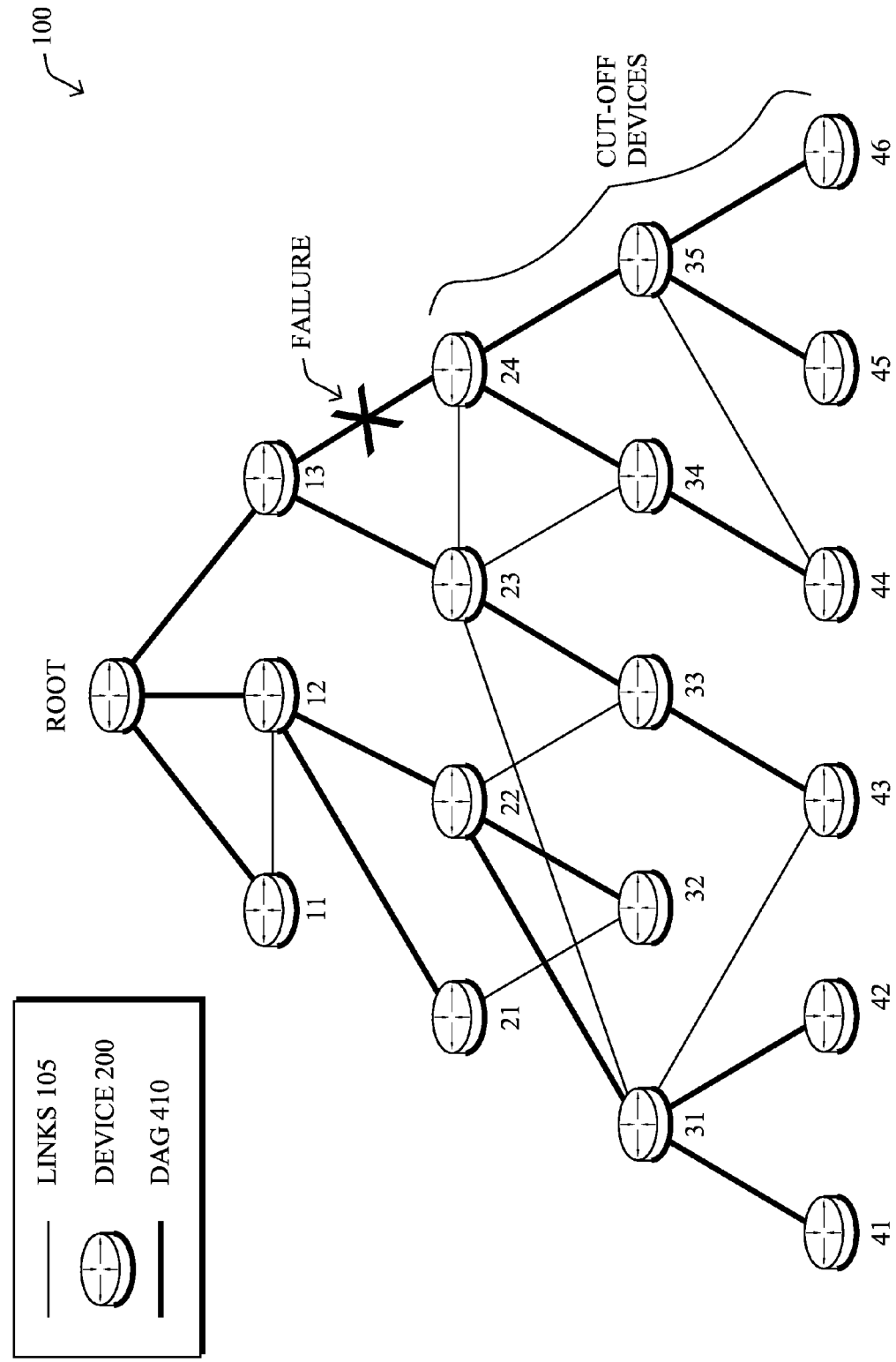
FIG. 5 illustrates an example network failure in the computer network.

As noted above, one of the main challenges with source routing is the convergence time. Consider the view of the network 100 as shown in FIG. 5. When a packet 140 is sent to node 24, it is source routed and the explicit route could be {ROOT-13-24}. In RPL networks, by contrast with routing protocols such as ISIS or OSPF, there is no fast probing to maintain routing adjacency considering the network resource constraints. Nodes may instead detect link failure using slow probing or by Neighbor Unreachability Detection (NUD) after sending a data packet. So, for example, if the root needs to send a packet to node 24, and the link 13-24 has failed (the "X" in FIG. 5), the root may not be aware of the link failure until a probe detects the failure, which may take an extended amount of time (e.g., several minutes). Using faster probing is clearly undesirable (due to the constrained network), and if there is no traffic generated by node 24, node 24 will not detect the link failure and thus it will not info in the DAG root, is which will continue to send packet along a broken path.

Though there exist a number of network recovery techniques, such as the use of diverse paths (e.g., "1:1" or "1+1" protection techniques, as may be understood by those skilled in the art), all of these techniques rely on the ability for the sender to quickly detect a link failure, which is unfortunately not possible in LLNs or other types of constrained networks because of the lack of fast probing.

Source Routing Convergence

The techniques herein provide for source routing convergence utilizing dynamically selected diverse paths (e.g., in a RPL network) based on implicitly detected failures, i.e., without explicit knowledge of a failure from the control plane. Specifically, according to one or more embodiments of the disclosure as described in detail below, a source routing device (e.g., root device) pre-computes diverse source-routed paths to one or more nodes in a computer network. Upon receiving a particular packet, the device forwards the particular packet on a source-routed first path of the pre-computed diverse paths. In the event the device implicitly detects failure of the first path, then it forwards a copy of the particular packet on a source-routed second path of the pre-computed diverse paths in response. In one embodiment, implicit failure detection comprises seeing a second (repeated) packet with the same identification within a certain time since the first packet, and the second packet is forwarded on the second path. In another embodiment, implicit failure detection comprises not seeing a link-layer acknowledgment returned, and a stored copy of the particular packet is forwarded on the second path.

Illustratively, the techniques described herein may be performed by hardware, software, and/or firmware, such as in accordance with source routing convergence process 248, which may contain computer executable instructions executed by processor 220 to perform functions relating to the novel techniques described herein. For example, the techniques herein may be treated as extensions to conventional protocols, such as the RPL protocol, and as such, would be processed by similar components understood in the art that execute the RPL protocol, accordingly. Also, while the techniques herein generally indicate that the root node of a DAG perform the techniques herein, other source-route head-end nodes (i.e., devices that begin a source-routed path or that otherwise indicate a source-routed path within a packet) may also make use of the techniques herein, accordingly.

Operationally, as stated above, the DAG shape built by RPL is mostly governed by the "Objective Function" (OF). An OF dictates a series of rules followed by the node to join a DAG (for example how to select their parents), which combines with the routing metrics/constraints dictate how the DAG is built in the network. For example, a implementation may choose to select two parents and always give preference to one of them (called the preferred parent), keeping the second parent as a back-up. In the non-storing mode mentioned above, the list of parents (optionally with preferences) are communicated to the DAG root that builds a DAG topology database (DTD), stored as a data structure 245.

In current implementations, when the root node originates a packet (or receives a packet from a server or network management services or "NMS" system) destined to a node in the DAG, the root builds "on the fly" a source route after consulting its DTD, adds a source route header (e.g., an "RH4" header, as will be understood), and forwards the packet. Alternatively, the paths may also be pre-computed.

According to one or more embodiments herein, however, a source routing device, such as the root node or other head-end device, pre-computes diverse source-routed paths to one or more nodes in the computer network 100, e.g., all of the nodes in the computer network or each destination node. Note that the DAG Root nodes are generally highly-capable devices (e.g., routers), and such computation is not problematic, nor is storing the set of pre-computed diverse paths for each destination in the DAG.

Depending on the network density, objective function, network topology, etc., it may not always be possible to find "N" diverse paths for each destination (e.g., N=2). For example, consider the node 44, as there is no node-diverse path between the root and the node 44 (all paths to node 44 must traverse node 13): In such a situation, if the root cannot find N diverse paths (either link or node diversity according to the policy and user configuration), the DAG root may dynamically adjust the advertised OF in its DIO messages 300 and send a new set of DIO messages. This leads to a new routing topology (DAG). For example, the DAG root may choose to relax some constraints (e.g., whether or not to route through battery-powered devices) in order to achieve greater path diversity, or may suggest nodes maintain more parents to offer more path diversity at the cost of extra control traffic, etc. In this manner, the DAG root may automatically tune the Objective Function using constraints that may be evaluated using the information already stored at the DAG root.

Note that there is often a tradeoff in selecting the appropriate Objective Function. For example, an Objective Function may wish to apply constraints or specify a minimum RPL Rank increase to minimize control traffic and reduce burden on resource-constrained devices. However, doing so also limits its set of feasible parents and thus the use of multi-path routing. The techniques herein thus benefit by providing a dynamic mechanism to adjust the amount of path diversity within the routing topology, as needed.

Figure 6:
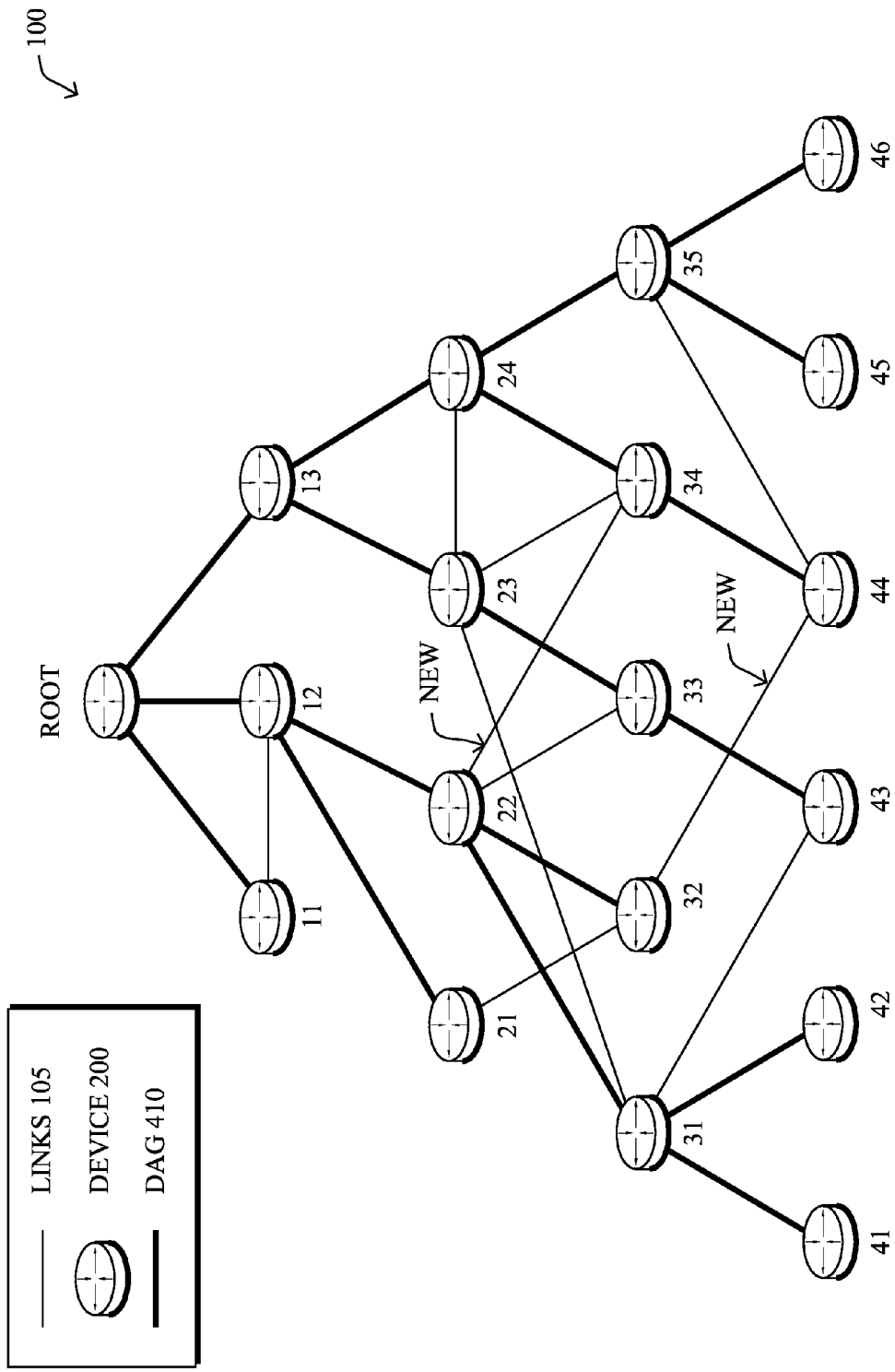
FIG. 6 illustrates an example adjusted DAG in the computer network.
Figure 7:
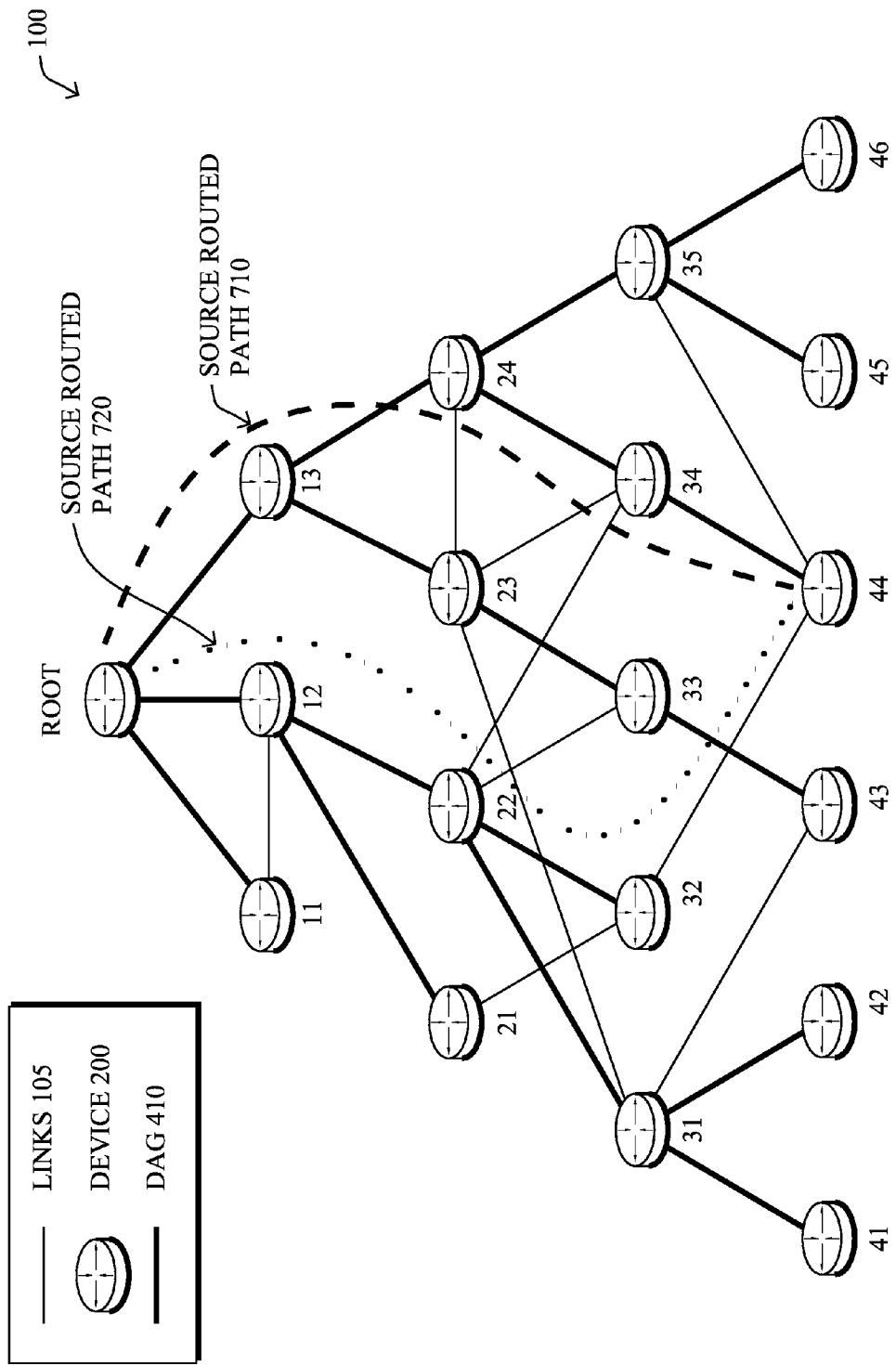
FIG. 7 illustrates diverse source-routed paths through the computer network.

As an example, FIG. 6 illustrates a dynamically adjusted DAG 410. In particular, during pre-computing of diverse paths, it may be determined that acceptably diverse paths do not exist to at least one particular node (e.g., node 44, etc.). Accordingly, the root node may, in response, adjust an objective function (OF) of the DAG to increase a possibility of pre-computing diverse paths to the at least one particular node. In this example, adjusting the OF comprises increasing a number of parent nodes for each node of the DAG to select (e.g., to 3). By increasing the number of parents in the DAG, new links have been illustratively added to the DAG, e.g., new routing adjacencies 34-22 and 44-32, and the DAG root can now find two node-diverse paths to node 44 ({ROOT-13-24-34-44} and {ROOT-12-22-32-44}). FIG. 7 illustrates these diverse paths (a first path 710 and a second path 720). (Note that new link 34-22 is not needed for diverse paths, to and is shown merely as an example of which nodes may have found new parents based on the updated OF.)

Note that while completely node/link diverse paths are shown, it should be understood that in certain circumstances it may not be possible to obtain a completely diverse path. For instance, from the root node to node 46, there will always be a shared is node and link on any computed diverse paths, i.e., node 35 and link 35-46. Accordingly, a "diverse" path may be acceptably diverse if it is diverse as possible, or as diverse as necessary (e.g., avoiding battery-operated nodes, etc.), and the completely diverse paths 710 and 720 are merely an example. Partially diverse paths may be useful, for example, in protecting the network traffic "as much as possible," as it may be deemed better to protect some of the path toward one or more nodes than to not offer any protection at all.

Once the diverse paths are pre-computed, another component of the embodiments herein is to receive and forward a particular packet (on a first path 710), and to implicitly detect network element failure (link/node failure) to redirect the particular packet along a diverse path (a second path 720).

Figure 8A:
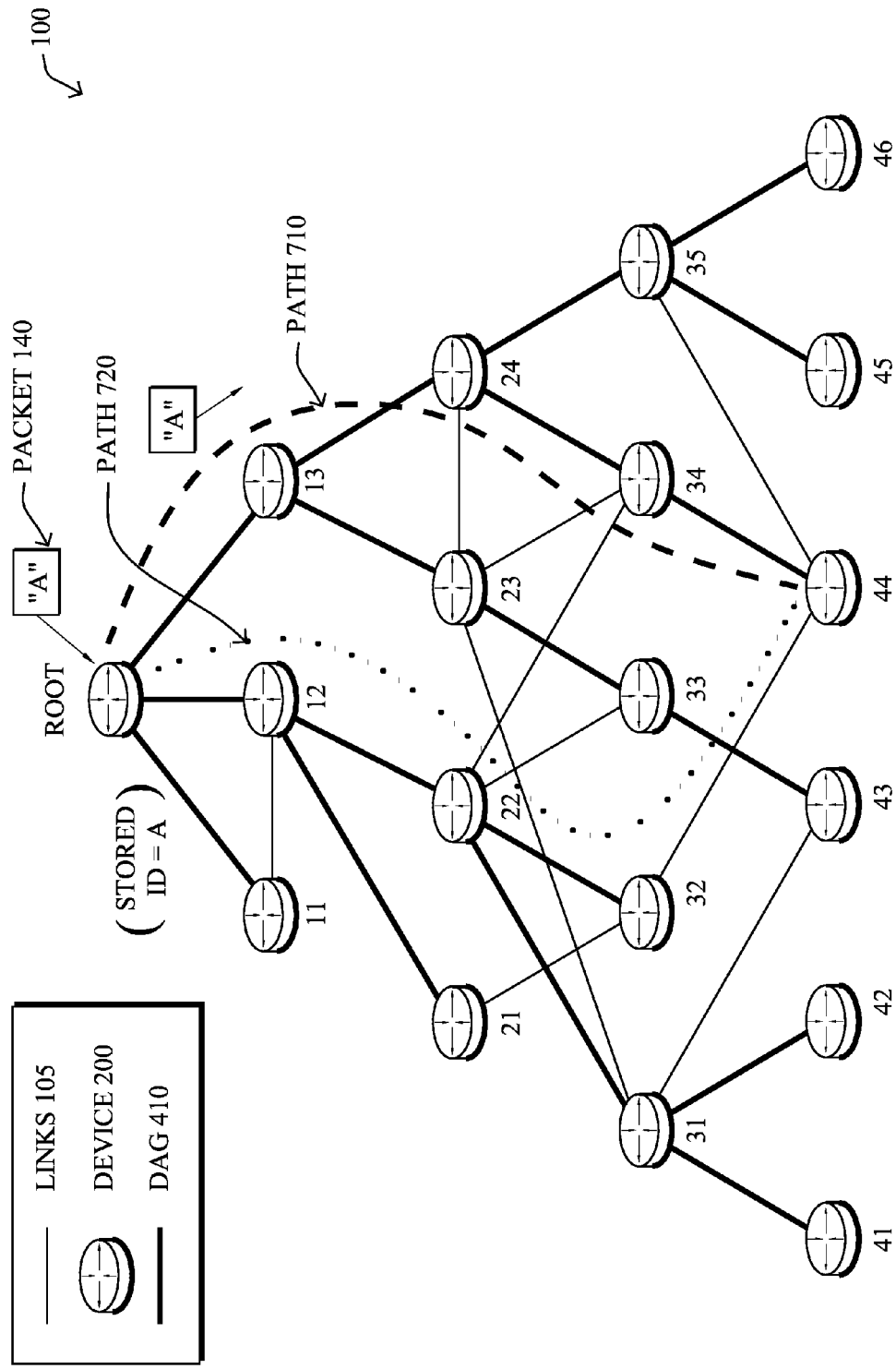
FIGS. 8A-B illustrate an example of source routing convergence.
Figure 8B:
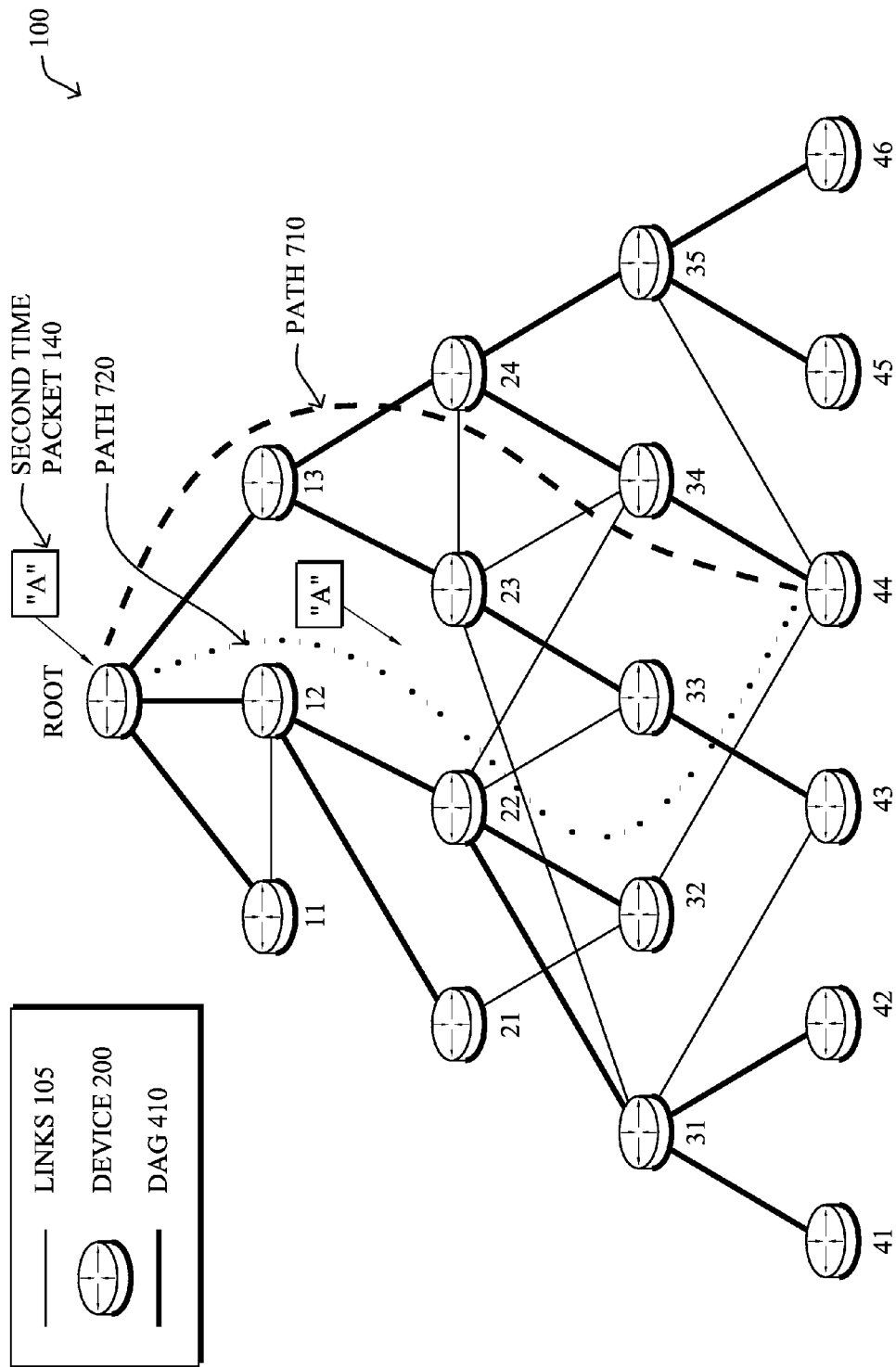

In a first embodiment herein, implicitly detecting failure of the first path is based on receiving a duplicate packet, i.e., a retransmission from a higher layer (e.g., application layer retransmission). In this situation, as illustrated in FIGS. 8A-B, the first time the DAG root originates a packet 140 or receives a packet originated outside of the LLN and destined to a node "X" in the DAG (e.g., to node 44) as shown in FIG. 8A, the root node determines a packet identification (ID) "A" of the particular packet (storing it in data structures 245), and initiates a timer "T1". The root node also records the path 710 used to forward the packet to node X. If the root sees the same packet (ID="A") before the expiration of T1, as shown in FIG. 8B, the root consults its database and selects a different path (e.g., a node diverse or link diverse if a node diverse path could be not found). In other words, upon determining that a second packet is received at the root that has the same packet ID as the previous packet sent on path 710, prior to expiration of the timer, then the second received packet is forwarded on the diverse path 720. This ensures that the once a packet is resent after the expiration of an application/transport timer because the path is broken (and not detected as such), the retransmitted packet is forwarded along a diverse path. Once the timer T1 expires without receiving a retransmitted packet, then the root may remove the packet identification from its database.

Figure 9:
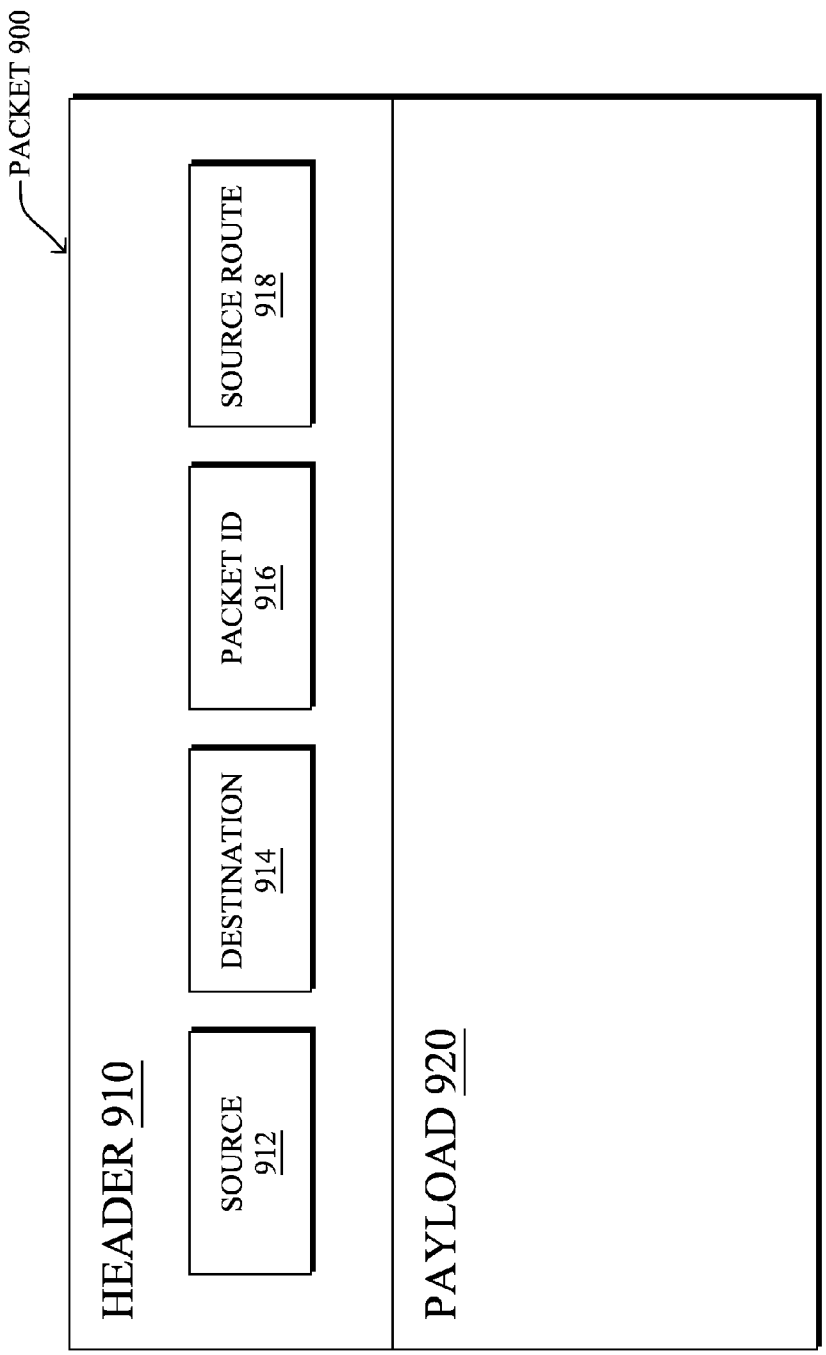
FIG. 9 illustrates an example packet.

As used herein, a "packet ID" or "packet identification" is a unique identifier of a is forwarded packet, whether it is an explicit packet ID within the packet 140 or a computed identification (e.g., a hash computed by the root node). For instance, FIG. 9 illustrates an example packet 900 (e.g., 140 in FIG. 1), which may be found within a typical traffic flow. For example, a packet 900 may generally comprise a header 910 and a payload 920. The header 910 contains information used to relay the packet, such as a source address 912 and destination address 914. Also, in one or more specific embodiments, the packet 900 may further include additional added information, such as a packet identifier field 916 and, notably, a source route field 918.

An explicit packet identifier (packet-ID field 916), for example, may be set by the source of the packet (does not change hop-by-hop), and as such, the receiving root node may check to see whether it has seen the packet ID from the source before. Alternatively, if the packet ID 916 or other explicit packet identifier value is not present, then the root node may compute an identification of the packet. That is, a computed identification may comprise such things as a hash result of the packet (i.e., performing a hash function on the packet), a checksum of the packet, and a direct comparison between the received particular packet and a collection of one or more previously received (and thus stored) packets.

According to an alternative embodiment herein, to implicitly detect failure of the first path 710, the source-routing node (e.g., root node) may cache packets and utilize an ICMP (Internet control message protocol) error to immediately detect link failures to determine whether to retransmit the stored packet along a different path. In particular, in networks where an ICMP error can be received by the node upstream to the link failure (for example the node 13), then the root node could, upon receiving the ICMP error, retransmit the packet 140 along a diverse path. Note that this embodiment is possible if the link layer supports reliable delivery, in which case, a lack of an acknowledgment (ACK) could translate into a link failure. Alternative embodiments may also be possible (depending on the link layer), for example, when link 13-24 fails, though the link layer may not support link layer reliable messaging, the node may still detect that the link is down. In this case, the node immediately upstream to the failure may still be able to send an ICMP error even if the link layer does not support ACK. In this mode (for either example above), instead of storing an ID of the first received packet, the root (source routing device) would store (cache) the packet itself.

Figure 10A:
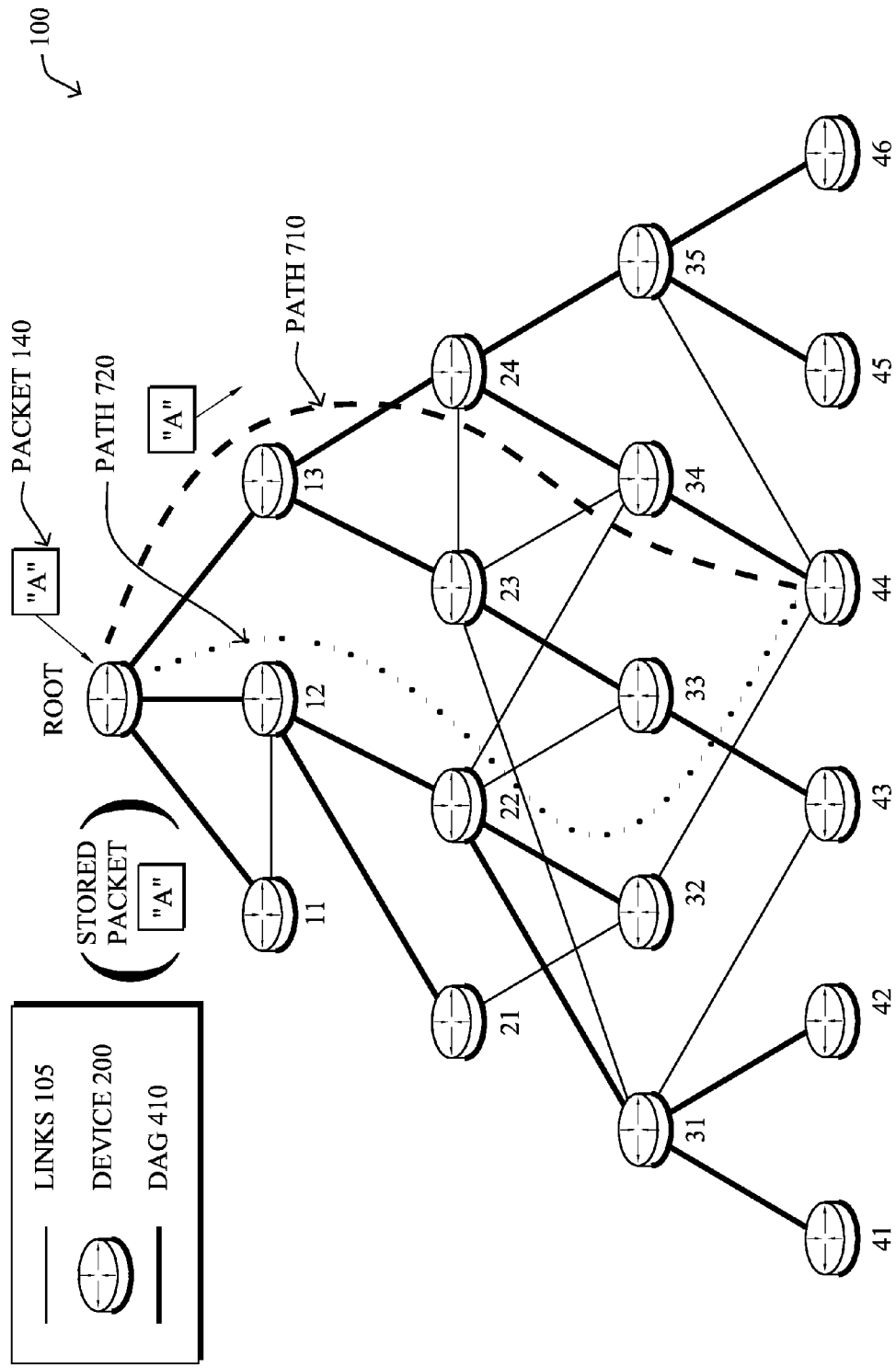
FIGS. 10A-C illustrate another example of source routing convergence.
Figure 10B:
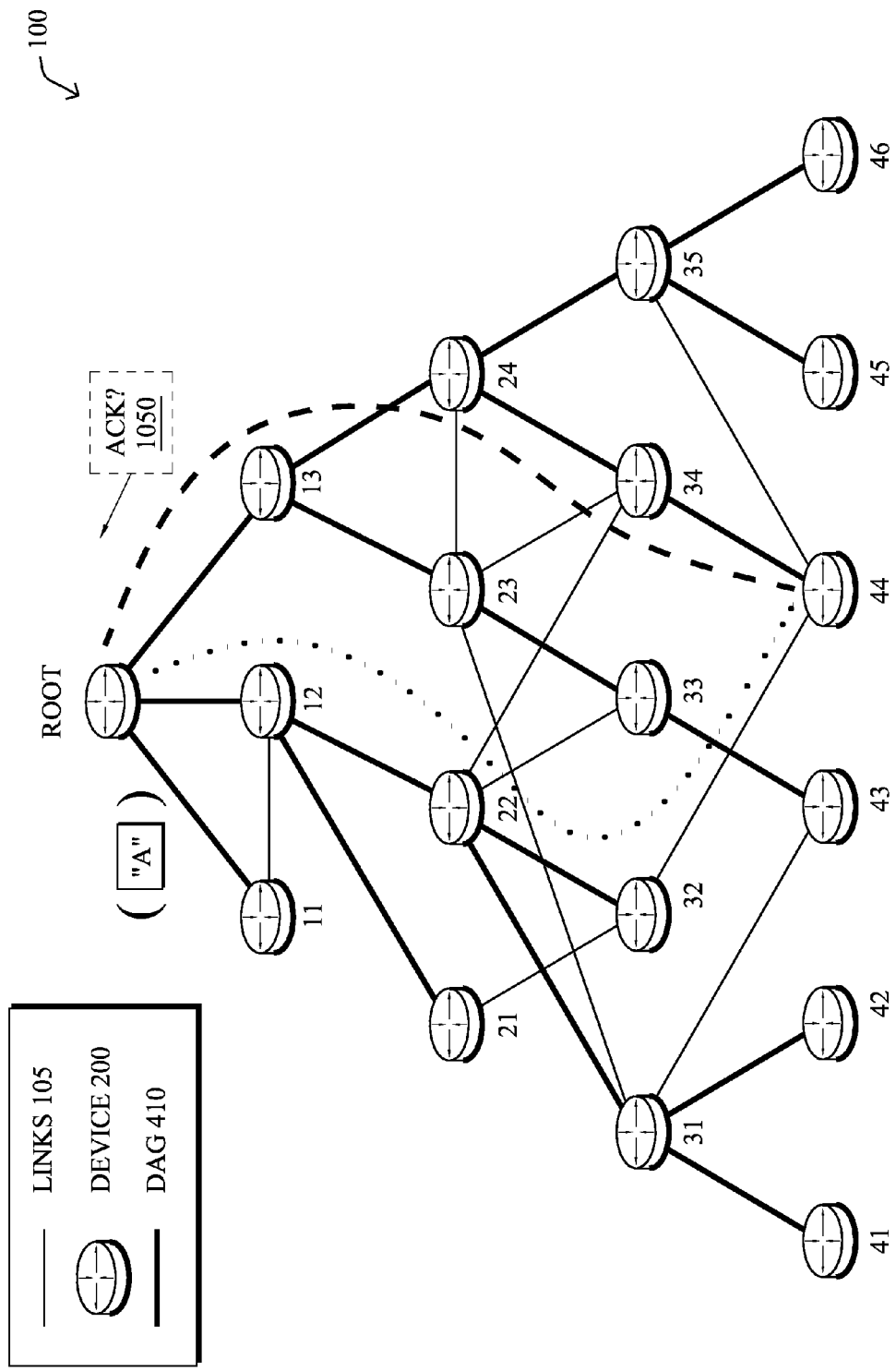
Figure 10C:
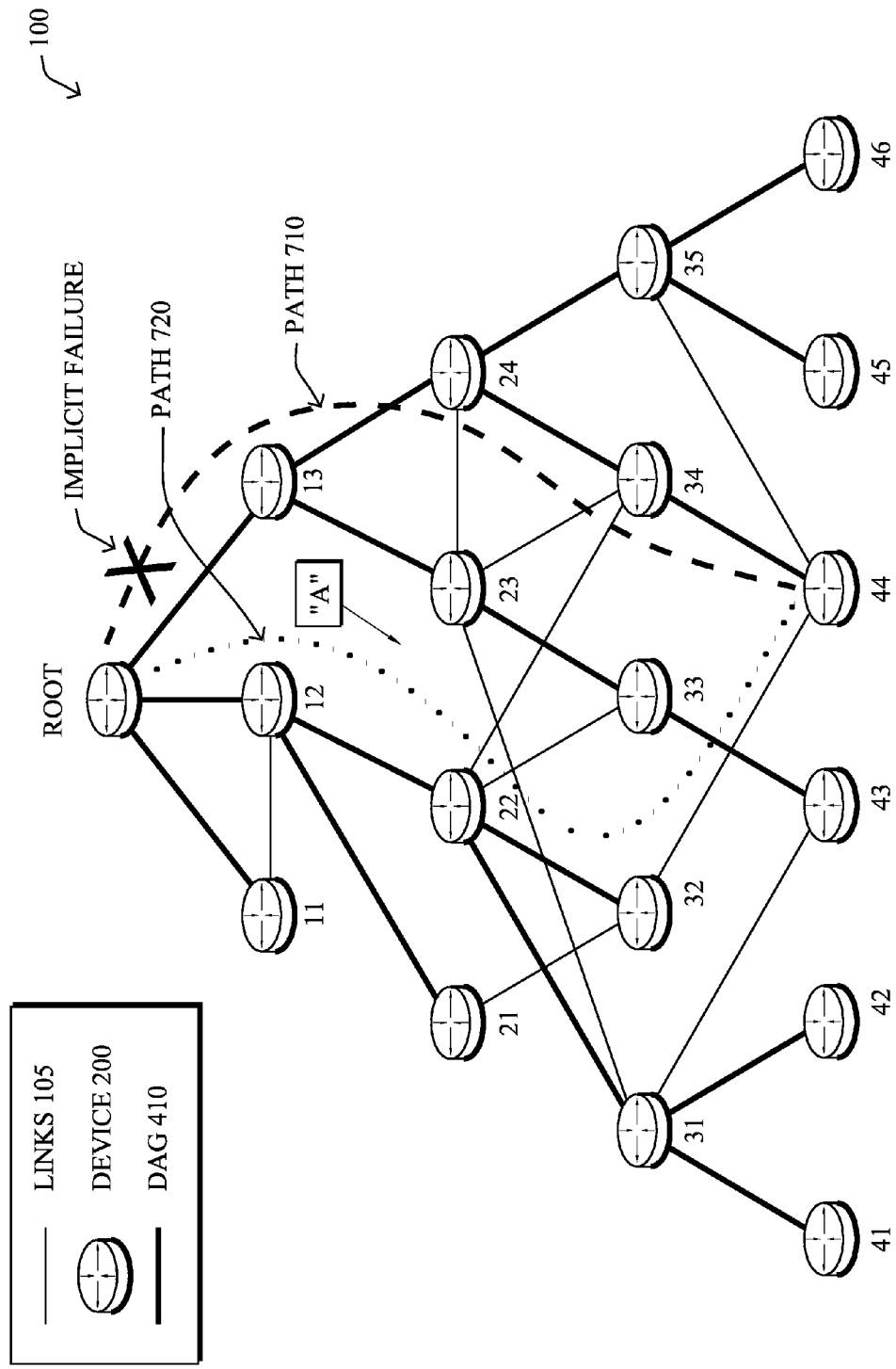

FIGS. 10A-C illustrate the above-mentioned embodiment. In particular, in FIG. 10A, assume that a packet "A" is received by the root node and destined along path 710 toward node 44. The root node stores the particular packet "A", and upon determining that there is no returned link-layer acknowledgment (ACK) in FIG. 10B for the particular packet from a destination of the particular packet, then the stored copy of the packet "A" is forwarded on the source-routed second path 720 in FIG. 10C, accordingly. It should be pointed out that while this example shows the lack of an ACK, another example may assume an explicit ICMP error message. For instance, while the previous example works because the link that fails is attached to the caching node (DAG Root), if the link 13-24 fails, and node 13 does not receive an ACK, then node 13 could determine that it has not received an ACK. Accordingly, node 13 may then send an ICMP error to the upstream node (e.g., the DAG root). In other words, the DAG root (or other upstream node) may rely on the reception of an explicit ICMP error received from a downstream node that has not received a link layer ACK.

Figure 11A:
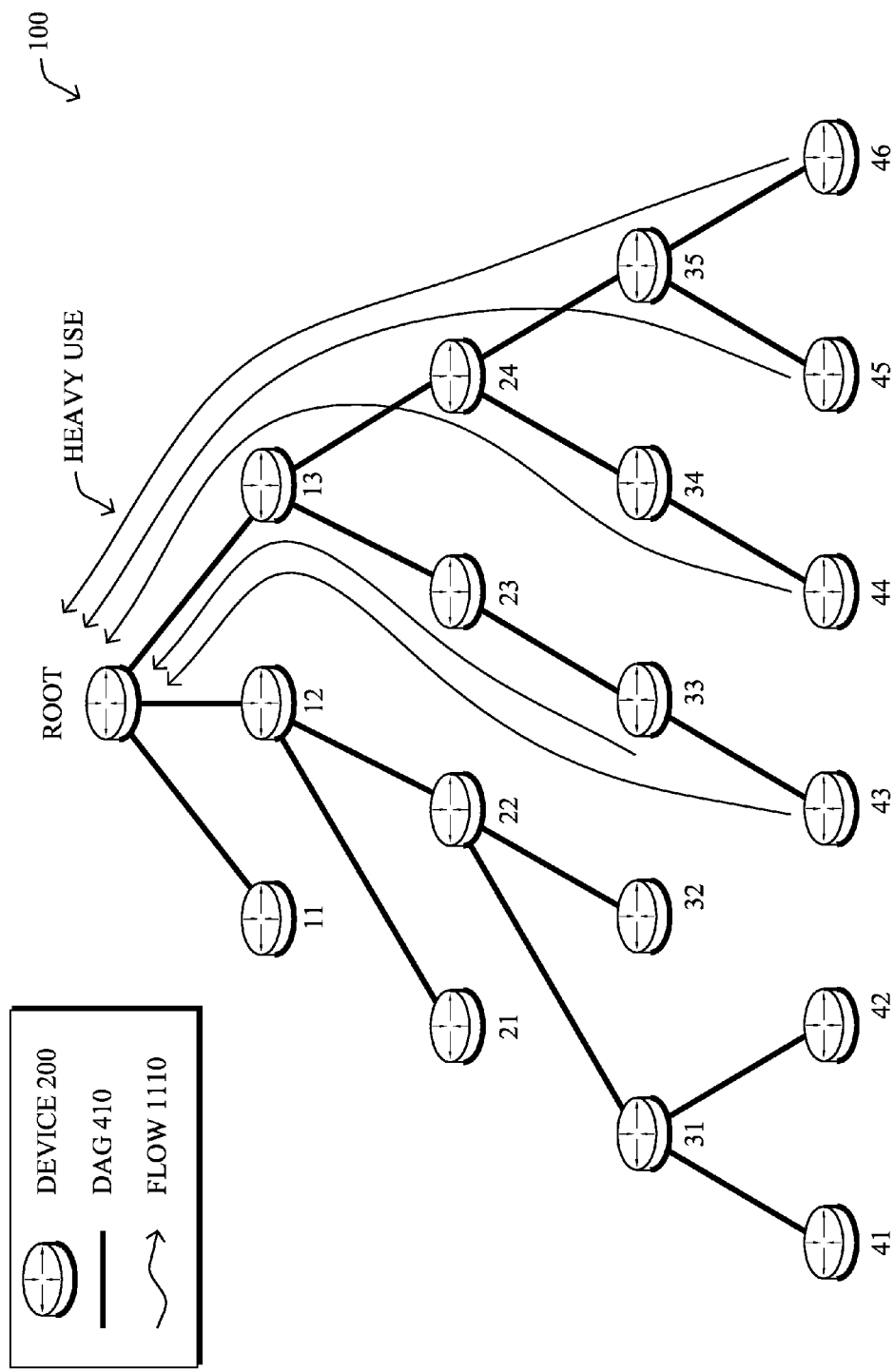
FIGS. 11A-B illustrate an example of upward traffic load-balancing.
Figure 11B:
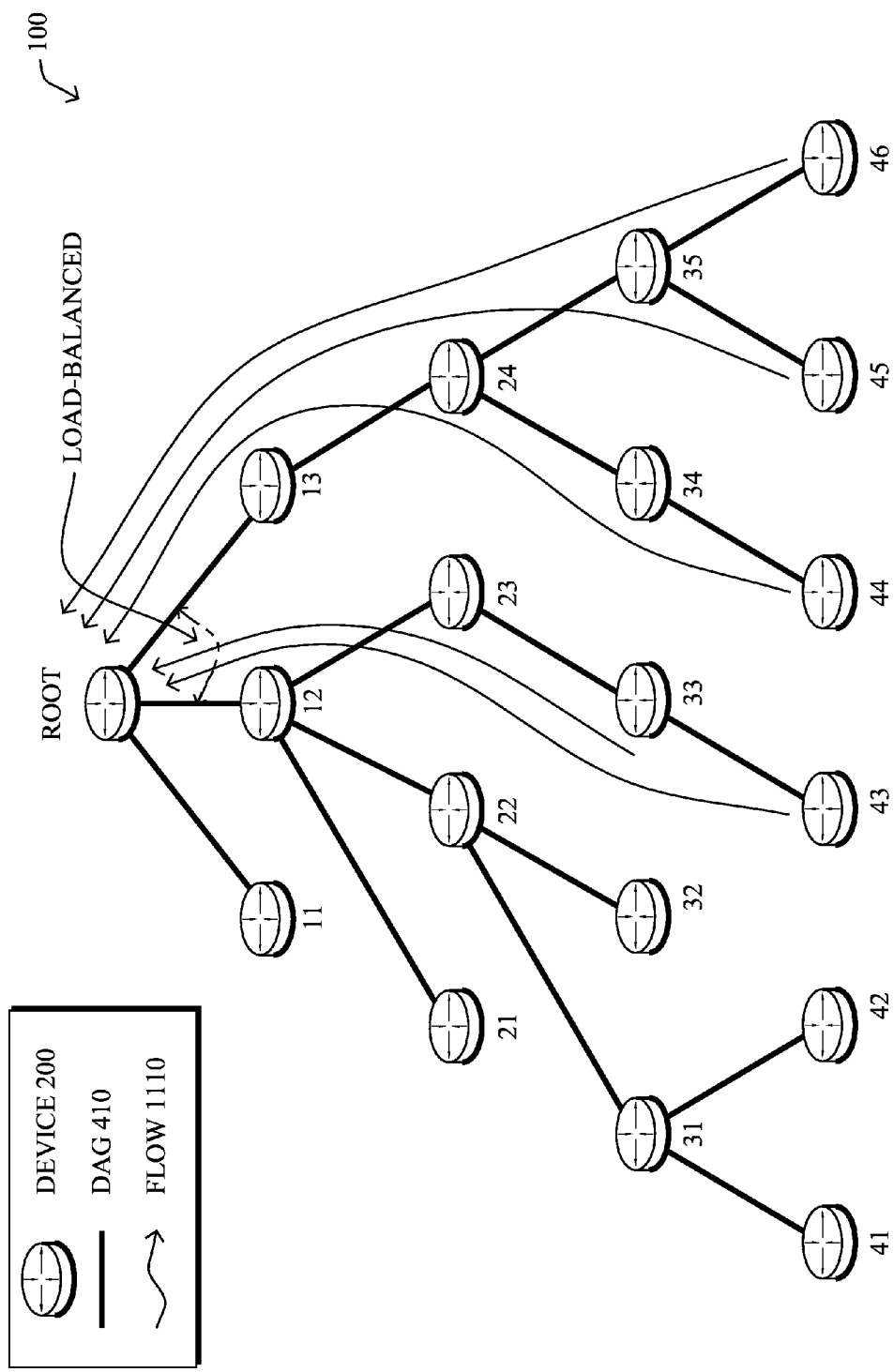

Notably, in accordance with one or more additional embodiments herein, statistics of the upward traffic (toward the root along the DAG 410) may be captured, such that the routing topology may be dynamically adjusted to balance the load of upward traffic and minimize the impact of a single link or node failure. That is, by monitoring the upward traffic, as shown in FIG. 11A, and computing statistics on the respective use of the paths from the DAG nodes to the root, if it is determined that the upward traffic is unbalanced within the DAG (flows 1110), the DAG root may adjust the OF to increase load-balancing of upward traffic so as to minimize the impact of a single link or node failure, such as the new DAG and flow shown in FIG. 11B. For example, additional or more stringent constraints may be applied to shift load to other devices. In this manner, traffic load on particular links/nodes may be reduced. Such a technique to load-balance may be particularly useful (and perhaps reserved for) specific, e.g., critical, traffic where delivery rate is of the utmost importance. Note also that this may also be achieved by selecting downward paths that avoid loaded portions of the network caused by upward traffic.

Figure 12:
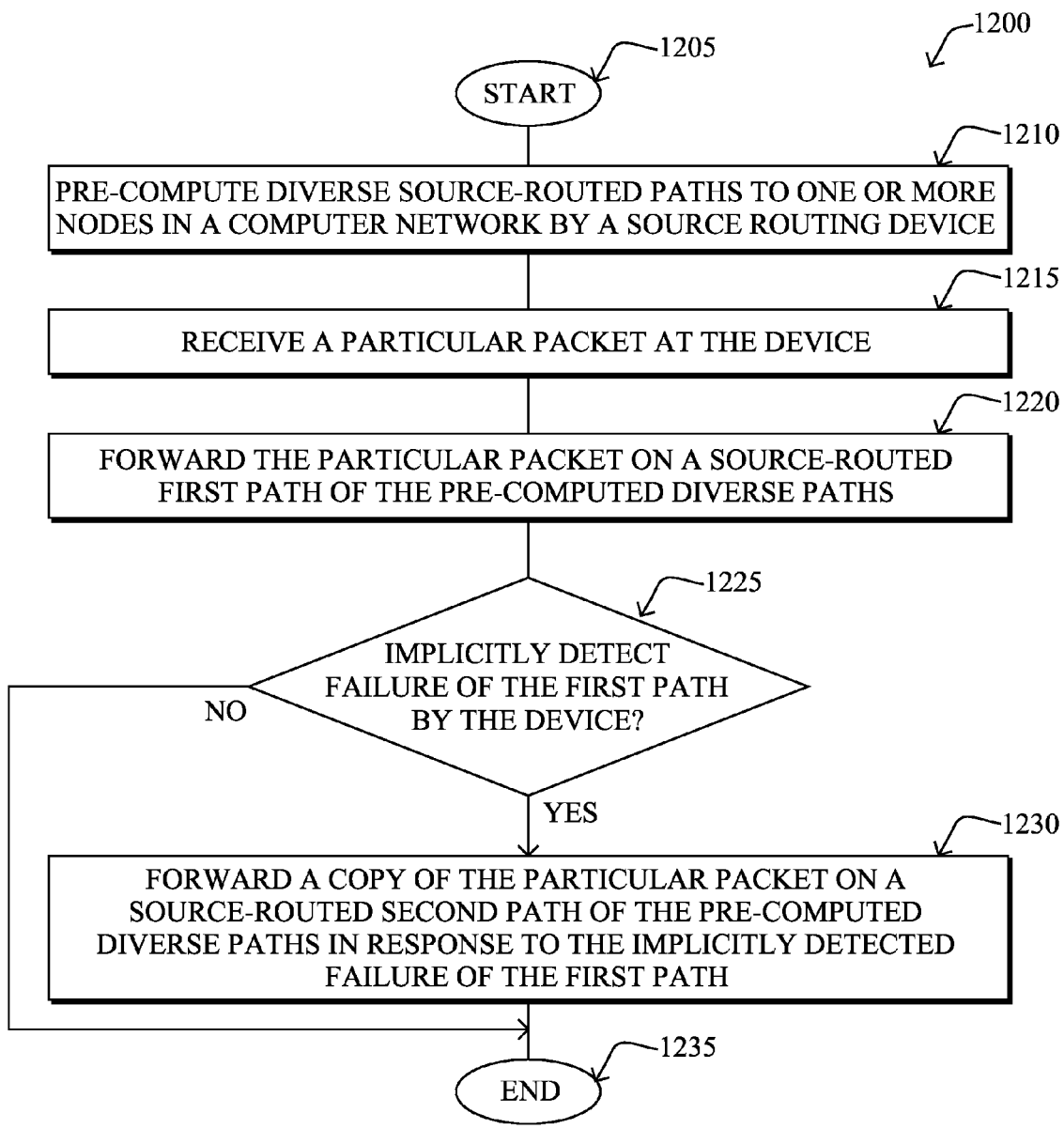
FIG. 12 illustrates an example simplified procedure for providing source routing convergence (failure protection) in accordance with one or more embodiments described herein.

FIG. 12 illustrates an example simplified procedure for providing source routing convergence (failure protection) in accordance with one or more embodiments described herein. The procedure 1200 starts at step 1205, and continues to step 1210, where, as described in detail above, a source-routing device (e.g., root node) pre-computes diverse source-routed paths (e.g., 710 and 720) to one or more nodes in a computer network 100. Upon receiving a particular packet 140/900 in step 1215, the device forwards the particular packet in step 1220 on a source-routed first path 710 of the pre-computed diverse paths.

If in step 1225 the source-routing device implicitly detects failure of the first path by the device, as described in detail above, then in step 1230 the device forwards a "copy" of the particular packet on a source-routed second path 720 of the pre-computed diverse paths in response to the implicitly detected failure of the first path. The simplified example procedure then ends in step 1235. Note that if a second failure is detected, the procedure may essentially repeat, either to forward the packet on a third diverse path, or else to retry the first path, etc.

Figure 13:
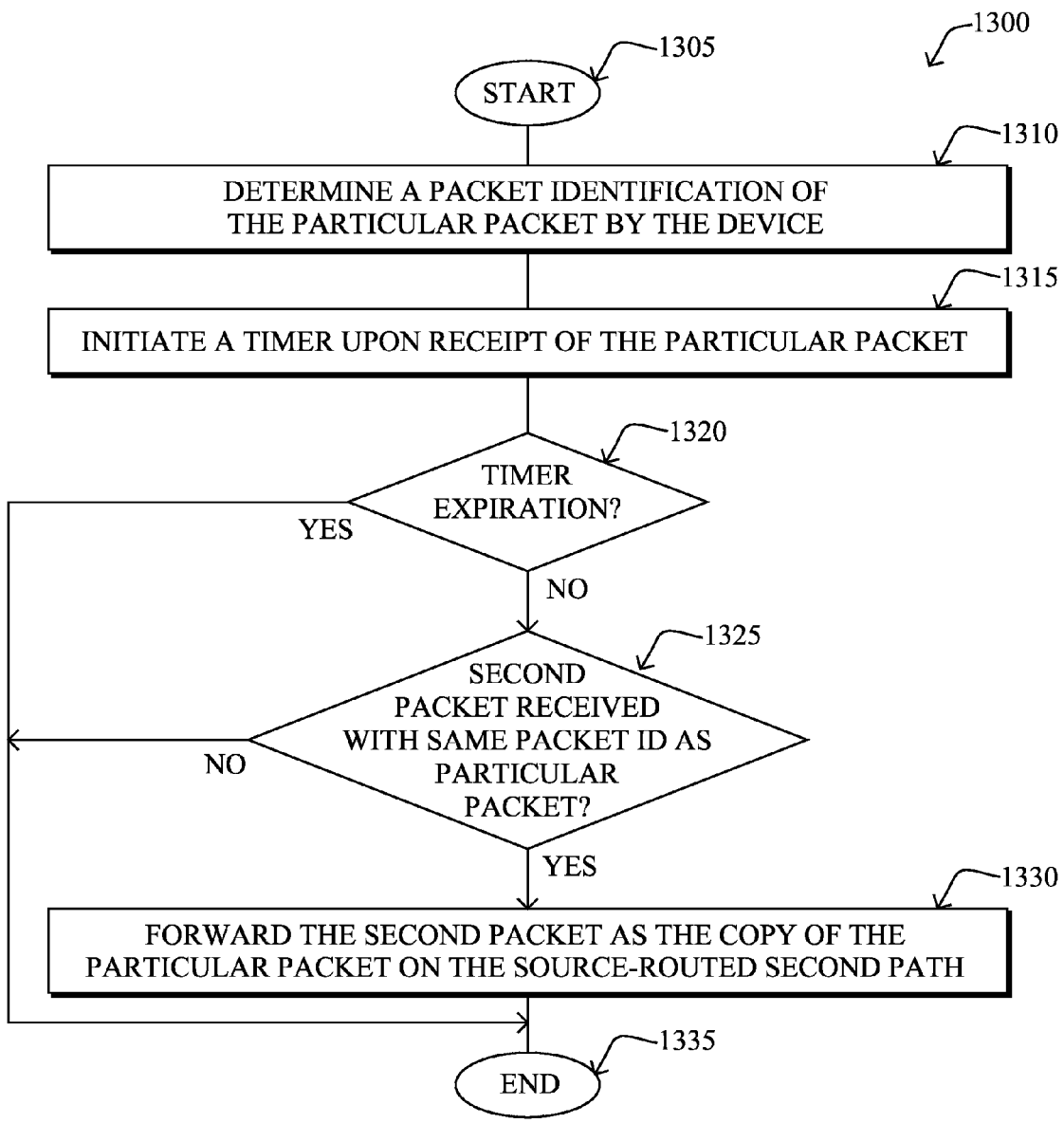
FIG. 13 illustrates a specific example procedure for providing source routing convergence (failure protection) in constrained computer networks in accordance with one or more embodiments described herein, e.g., based on packet identification.

FIG. 13 illustrates a specific example procedure for providing source routing convergence (failure protection) in constrained computer networks in accordance with one or more embodiments described herein, e.g., based on packet identification. In particular, the procedure 1300 may be a specific implementation of steps 1225-1235 in procedure 1200 of FIG. 12 above to detect and handle a failure. The procedure 1300 starts at step 1305, and continues to step 1310, where, as described in detail above, once a packet is received, then a packet identification of the particular packet 140 (140*a*) may be determined, and in step 1315, a timer may be initiated. If the timer has not yet expired in step 1320, and if a second packet 140*b* is received in step 1325 that has the same packet identification as the particular packet (an explicit ID, computed ID, etc.), then in step 1330 the device (e.g., root node) forwards the second received packet as the copy of the particular packet on the source-routed second path 720, and the procedure 1300 ends in step 1335.

Figure 14:
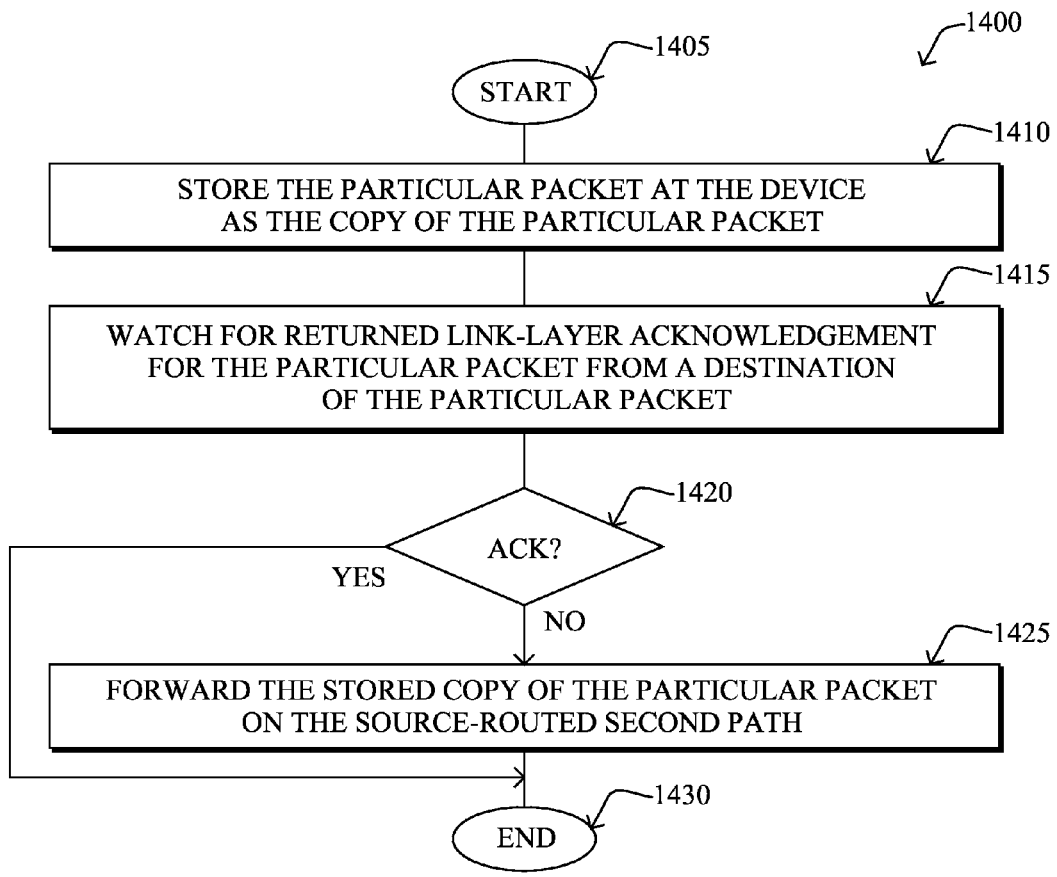
FIG. 14 illustrates another specific example procedure for providing source routing convergence (failure protection) in constrained computer networks in accordance with one or more embodiments described herein, e.g., based on link-layer acknowledgments.

Alternatively, FIG. 14 illustrates another specific example procedure for providing source routing convergence (failure protection) in constrained computer networks in accordance with one or more embodiments described herein, e.g., based on link-layer acknowledgments. Similar to FIG. 13 above, the procedure 1400 may be a specific implementation of steps 1225-1235 in procedure 1200 of FIG. 12 above to detect and handle a failure. The procedure 1400 starts at step 1405, and continues to step 1410, where, as described in detail above, once a packet 140 is received, the device stores the particular packet, and watches for a returned link-layer acknowledgment 1050 for the particular packet from a destination of the particular packet in step 1415. If there is no acknowledgment ("ACK") in step 1420 or, in the alternative, if the node explicitly receives an ICMP error, then a failure is implicitly detected, and in step 1425 the device forwards the stored copy of the particular packet on the source-routed second path 720, and the procedure 1400 ends in step 1430.

Figure 15:
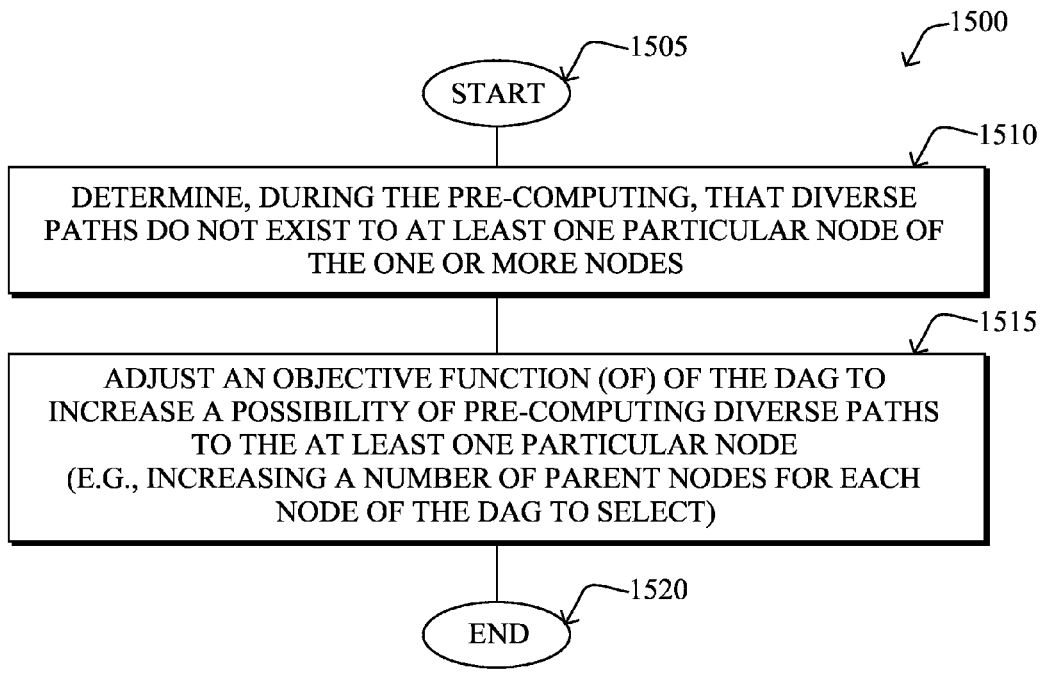
FIG. 15 illustrates an example simplified procedure for enhancing the possibility of pre-computing diverse paths in accordance with one or more embodiments described herein.

In addition, as noted above, the objective function (OF) of a DAG may be adjusted for various reasons. For instance, FIG. 15 illustrates an example simplified procedure for enhancing the possibility of pre-computing diverse paths in accordance with one or more embodiments described herein. The procedure 1500 starts at step 1505, and continues to step 1510, where, as described in detail above, it may be determined, during pre-computing diverse paths, that diverse paths do not exist to at least one particular node in the network. As such, in step 1515, the objective function (OF) of the DAG may be adjusted to increase a possibility of pre-computing diverse paths to the at least one particular node. For example, the new OF may increase a number of parent nodes to be selected by each node of the DAG. The procedure 1500 ends in step 1520, notably with the ability to repeat in the event diverse paths are still not located, e.g., further adjusting the OF as desired in order to find diverse paths.

Figure 16:
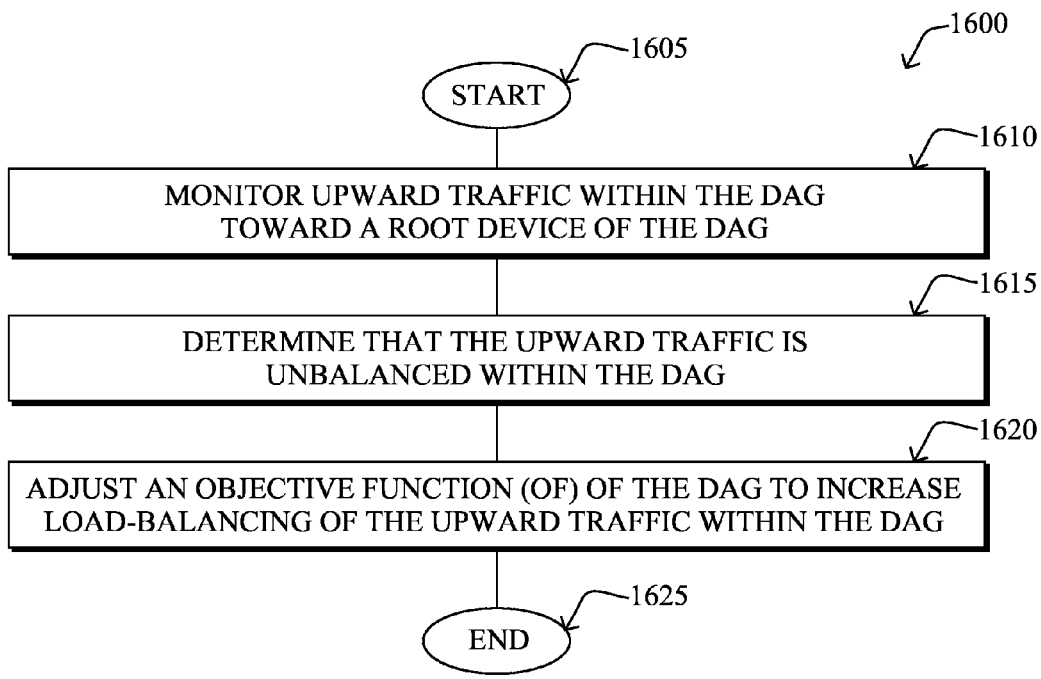
FIG. 16 illustrates an example simplified procedure for load-balancing upward traffic in accordance with one or more embodiments described herein.

Also, FIG. 16 illustrates another reason for adjusting a DAG's OF, namely an example simplified procedure for load-balancing upward traffic in accordance with one or more embodiments described herein. The procedure 1600 starts at step 1605, and continues to step 1610, where, as described in detail above, a device (e.g., the root device) monitors upward traffic within the DAG 410 toward a root device of the DAG, and in step 1615 can determine whether the upward traffic is unbalanced within the DAG. If so, then in step 1620 the objective function (OF) of the DAG can be adjusted to increase load-balancing of the upward traffic within the DAG, as described above (e.g., with reference to FIGS. 11A-B). The procedure 1600 ends in step 1625.

It should be noted that FIGS. 12-16 are merely examples for illustration, and are not meant to be limiting to the scope of the embodiments herein. For instance, while certain steps within the procedures 1200 through 1600 may be optional as described above, certain steps may be included or excluded as desired, and the steps may also be in a different order where suitable.

The novel techniques described herein, therefore, provide source routing convergence (failure protection) in constrained computer networks. In particular, convergence time, which is one of the major drawbacks of source routing in non-storing networks (e.g., metering networks), and because of the resource constraints, fast probing to detect network element failure is generally not a viable option. The techniques herein thus dramatically reduce the convergence time without requiring additional control plane overhead. Specifically, the techniques herein infer higher-layer retransmissions based on monitoring packet IDs or ICMP messages, and retransmit on different and diverse paths accordingly. That is, a key component of the embodiments described herein is that the head-end of the primary path (e.g., root node) detects a packet retransmission based on packet inspection, which, unlike conventional failure protection techniques, occurs even if the primary path failure has not been detected by the control plane.

While there have been shown and described illustrative embodiments that provide source routing convergence in constrained computer networks, it is to be understood that various other adaptations and modifications may be made within the spirit and scope of the embodiments herein. For example, the embodiments have been shown and described herein with relation to LLNs, and more particularly, to the RPL protocol. However, the embodiments in their broader sense are not as limited, and may, in fact, be used with other types of networks and/or protocols, particularly those that may be constrained or simply those without fast network element failure detection. Also, while the techniques described above make reference to wireless communication or other shared media (e.g., PLC), other types of communication media (e.g., wired) may also be used.

Note also, that in one or more particular embodiments herein, the source-routed paths 710 and 720 may be alternatively configured as label-switched paths. In this case, the root node would similarly select another diverse path, but instead of prepending a new source route header, the node would select a different label-switched path to the destination.

Furthermore, while the above description illustrates failure protection for all traffic/packets transmitted in the network, the techniques herein may also be applied selectively to only a certain subset of traffic. For instance, traffic of a certain type, class, priority, etc., may be protected (e.g., monitored to determine whether proper reception has occurred), while other different types, classes, priorities, etc., may not need protection. In other words, implicitly detecting failure as described above may be performed in response to first determining that a particular packet is classified as a packet to protect.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method, comprising:
pre-computing diverse source-routed paths to one or more nodes in a computer network by a source routing device;
receiving a particular packet at the device;
determining an identification of the particular packet;
forwarding the particular packet on a source-routed first path of the pre-computed diverse paths;
implicitly detecting failure of the first path by the device by detecting a second packet with a same identification as the particular packet that has been received at the source routing device after the particular packet has already been received at the device and prior to expiration of a timer, wherein the detecting of the same identification indicates that the second packet is a repeated packet and has already been forwarded from the source routing device along the first path and should not again be forwarded along the first path; and forwarding a copy of the particular packet on a source-routed second path of the pre-computed diverse paths in response to the implicitly detected failure of the first path.

2. The method as in claim 1,
wherein the method further comprises:
forwarding the second packet as the copy of the particular packet on the source-routed second path in response to determining that the second packet received at the device has the same packet identification as the particular packet prior to expiration of the timer.

3. The method as in claim 2, wherein the packet identification is selected from a group consisting of: an explicit packet identifier value; and a computed identification of the packet, the computed identification further selected from a second group consisting of: a hash result of the packet; a checksum of the packet; and a direct comparison between the received particular packet and the previously received packet.

4. The method as in claim 1, wherein the computer network is configured as a directed acyclic graph (DAG).

5. The method as in claim 4, further comprising:
determining, during the pre-computing, that diverse paths do not exist to at least one particular node of the one or more nodes; and
in response, adjusting an objective function (OF) of the DAG to increase a possibility of pre-computing diverse paths to the at least one particular node.

6. The method as in claim 5, wherein adjusting the OF comprises:
increasing a number of parent nodes for each node of the DAG to select.

7. The method as in claim 4, further comprising:
monitoring upward traffic within the DAG toward a root device of the DAG;
determining that the upward traffic is unbalanced within the DAG; and
in response, adjusting an objective function (OF) of the DAG to increase load-balancing of the upward traffic within the DAG.

8. The method as in claim 4, wherein the device is a root of the DAG.

9. The method as in claim 1, wherein the one or more nodes in the computer network consist of all of the nodes in the computer network.

10. The method as in claim 1, wherein the source-routed first and second paths are label-switched paths.

11. The method as in claim 1, wherein implicitly detecting failure is performed in response to determining that the particular packet is classified as a packet to protect.

12. An apparatus, comprising:
one or more network interfaces to communicate in computer network using source routing;
a processor coupled to the network interfaces and adapted to execute one or more processes; and
a memory configured to store a process executable by the processor, the process when executed operable to:
pre-compute diverse source-routed paths to one or more nodes in the computer network;
receive a particular packet;
determine an identification of the particular packet;
forward the particular packet on a source-routed first path of the pre-computed diverse paths;
implicitly detect failure of the first path by the device by detecting a second packet with a same identification as the particular packet that has been received at the source routing device after the particular packet has already been received at the device and prior to expiration of a timer, wherein the detecting of the same identification indicates that the second packet is a repeated packet and has already been forwarded from the source routing device along the first path and should not again be forwarded along the first path; and
forward a copy of the particular packet on a source-routed second path of the pre-computed diverse paths in response to the implicitly detected failure of the first path.

13. The apparatus as in claim 12,
wherein the process when executed to forward the copy of the particular packet is operable to:
forward the second packet as the copy of the particular packet on the source-routed second path in response to determining that the second packet received at the apparatus has the same packet identification as the particular packet prior to expiration of the timer.

14. The apparatus as in claim 12, wherein the computer network is configured as a directed acyclic graph (DAG), and wherein the process when executed is further operable to:
determine, during pre-computing, that diverse paths do not exist to at least one particular node of the one or more nodes; and
in response, adjust an objective function (OF) of the DAG to increase a possibility of pre-computing diverse paths to the at least one particular node.

15. The apparatus as in claim 14, wherein the process when executed to adjust the OF is operable to:
increase a number of parent nodes for each node of the DAG to select.

16. The apparatus as in claim 12, wherein the apparatus is a root device of a directed acyclic graph (DAG).

17. The apparatus as in claim 12, wherein the one or more nodes in the computer network consist of all of the nodes in the computer network.

18. A tangible, non-transitory, computer-readable media having software instructions thereon, the software instructions, when executed by a processor on a device in a computer network, operable to:
pre-compute diverse source-routed paths to one or more nodes in the computer network;
receive a particular packet;
determine an identification of the particular packet;
forward the particular packet on a source-routed first path of the pre-computed diverse paths;
implicitly detect failure of the first path by the device by detecting a second packet with a same identification as the particular packet that has been received at the source routing device after the particular packet has already been received at the device and prior to expiration of a timer, wherein the detecting of the same identification indicates that the second packet is a repeated packet and has already been forwarded from the source routing device along the first path and should not again be forwarded along the first path; and
forward a copy of the particular packet on a source-routed second path of the pre-computed diverse paths in response to the implicitly detected failure of the first path.

19. The computer-readable media as in claim 18,
wherein the software instructions when executed to forward the copy of the particular packet are operable to:
forward the second packet as the copy of the particular packet on the source-routed second path in response to determining that the second packet received at the device has the same packet identification as the particular packet prior to expiration of the timer.

20. The computer-readable media as in claim 18, wherein the computer network is configured as a directed acyclic graph (DAG), and wherein the software instructions when executed are further operable to:
   determine, during pre-computing, that diverse paths do not exist to at least one particular node of the one or more nodes; and
   in response, adjust an objective function (OF) of the DAG to increase a possibility of pre-computing diverse paths to the at least one particular node.

\* \* \* \* \*